US007484105B2

(12) United States Patent  (10) Patent No.: US 7,484,105 B2
Goodman et al.  (45) Date of Patent: Jan. 27, 2009

(54) FLASH UPDATE USING A TRUSTED PLATFORM MODULE

(75) Inventors: Steven Dale Goodman, Raleigh, NC (US); James Patrick Hoff, Raleigh, NC (US); Randall Scott Springfield, Chapel Hill, NC (US); James Peter Ward, Raleigh, NC (US)

(73) Assignee: Lenovo (Singapore) Ptd. Ltd., Singapore (SG)

( * ) Notice: Subject to any disclaimer, the term of this patent is extended or adjusted under 35 U.S.C. 154(b) by 1727 days.

(21) Appl. No.: 09/931,629

(22) Filed: Aug. 16, 2001

(65) Prior Publication Data

US 2003/0037246 A1  Feb. 20, 2003

(51) Int. Cl.
   G06F 11/30  (2006.01)
   H04L 9/32  (2006.01)
   H04L 9/00  (2006.01)
(52) U.S. Cl. ............................. 713/191; 726/22; 726/23; 726/24; 726/25; 726/26; 726/30; 713/163; 713/164; 713/166; 713/167; 713/168; 380/277; 380/278; 380/279
(58) Field of Classification Search ......... 713/200–202, 713/1, 189–191, 2; 711/103, 164; 385/185.04
   See application file for complete search history.

(56) References Cited

U.S. PATENT DOCUMENTS

| 5,522,076 | A | 5/1996 | Dewa et al. .................. 395/700 |
| 5,748,888 | A | 5/1998 | Angelo et al. ............... 395/186 |
| 5,802,592 | A | 9/1998 | Chess et al. .................. 711/164 |
| 5,835,594 | A | 11/1998 | Albrecht et al. ............... 380/23 |
| 5,844,986 | A | 12/1998 | Davis ............................. 380/4 |
| 5,859,911 | A | 1/1999 | Angelo et al. ................. 380/25 |
| 5,937,063 | A | 8/1999 | Davis ............................ 380/4 |
| 5,944,821 | A | 8/1999 | Angelo ....................... 713/200 |
| 5,949,882 | A | 9/1999 | Angelo ......................... 380/25 |
| 5,974,250 | A | 10/1999 | Angelo et al. ............... 395/653 |
| 5,987,536 | A | 11/1999 | Johnson et al. ............... 710/36 |
| 6,009,524 | A | 12/1999 | Olarig et al. ................. 713/200 |
| 6,138,239 | A | 10/2000 | Veil ........................... 713/200 |
| 6,148,387 | A | 11/2000 | Galasso et al. .............. 711/203 |
| 6,185,678 | B1 | 2/2001 | Arbaugh et al. ................ 713/2 |
| 6,188,602 | B1 * | 2/2001 | Alexander et al. ..... 365/185.04 |
| 6,363,463 | B1 * | 3/2002 | Mattison ..................... 711/164 |
| 6,564,317 | B1 * | 5/2003 | Hale et al. ..................... 713/1 |
| 6,678,833 | B1 * | 1/2004 | Grawrock ................... 713/401 |
| 2003/0177378 | A1 * | 9/2003 | Wittkotter ................... 713/193 |

OTHER PUBLICATIONS

Grawrock "Building Trust and Privacy into Open PC Systems" (Nov. 2000).*
"Client Security in the Enterprise Network: Dell's Perspective," *Dell Highlight*, Feb. 2000, pp. 1-6.
"Trusted Computing Platform Alliance (TCPA)," *Main Specification Version 1.0*, Jan. 25, 2001, pp. 1-284.

* cited by examiner

*Primary Examiner*—Longbit Chai
(74) *Attorney, Agent, or Firm*—Winstead P.C.

(57) ABSTRACT

An update utility requests a signature verification of the utility's signature along with a request to unlock the flash memory stored in the utility. A trusted platform module ("TPM") performs a signature verification of the utility using a previously stored public key. Upon verification of the signature, the TPM unlocks the flash memory to permit update of the utility. Upon completion of the update, the flash utility issues a lock request to the TPM to relock the flash memory.

9 Claims, 3 Drawing Sheets

FLASH UPDATE USING A TRUSTED PLATFORM MODULE

CROSS-REFERENCE TO RELATED APPLICATIONS

The present application relates to U.S. patent application Ser. No. 09/931,550, entitled "System Management Interrupt Generation Upon Completion of Cryptographic Operation"; and U.S. patent application Ser. No. 09/931,531, entitled "Proving BIOS Trust in a TCPA Compliant System," which are hereby incorporated by reference herein.

TECHNICAL FIELD

The present invention relates in general to information handling systems, and in particular, to the update of information in an information handling system.

BACKGROUND INFORMATION

The Basic Input/Output System (BIOS) of a computer is the backbone of the operation of that computer. The BIOS is programming that controls the basic hardware operations of the computer, including interaction with floppy disk drives, hard disk drives and the keyboard. Because of ever changing computer technologies, even though a computer may still be acceptable to a user, often the BIOS of that computer will not support all of the new technologies.

A conventional method for upgrading the BIOS code or image of a computer is to physically replace the Read-Only-Memory (ROM) based BIOS, which in networks systems, would entail replacing the ROM-BIOS in each processor node, which is very time consuming and adds to the overall system down-time of the network.

There have been solutions for updating a BIOS image associated with a processor without having to physically replace the ROM-BIOS at each computer in the network. For example, one solution is to provide the computer with a Flash EPROM for the BIOS, also known as a Flash BIOS. With a Flash BIOS, the BIOS image or a portion of the BIOS image can be updated by a software update. This is often performed by downloading or storing the Flash information onto a media storage device, such as a floppy disk, and using the disk at each computer to flash the BIOS. However, this is very time consuming, especially with large network systems. Further, some of the computers on the network may not have floppy drives or the proper medium transfer device.

A second method is to send the flash over the network to each computer in the network. The problem with this method is that the flash is subject to someone introducing malicious code, such as a virus, to the flash, thereby causing the BIOS to be flashed with a corrupt image.

Yet another method includes transferring the flash information from the source computer to the receiving computer, with the flash information including the flash code, the flash code instructions and an encrypted digital signature corresponding to the identification of the flash code. The sender is authenticated and then the receiving computer is operably placed in a secure mode. A hash value corresponding to the flash information is calculated, and the digital signature from the flash information is decrypted. The flash code is validated by comparing the digital signature of the flash information to the calculated hash, and if validated, the BIOS is flashed with the new flash code, the new flash code is verified, and the computer re-booted power cycled.

As a result, there is a need in the art for a more secure procedure for updating a utility within the data processing system.

SUMMARY OF THE INVENTION

The present invention addresses the foregoing need by having an update utility request a signature verification of the utility's signature along with a request to unlock the flash memory. A trusted platform module ("TPM") performs a signature verification of the utility using a previously stored public key. Upon verification of the signature, the TPM unlocks the flash memory to permit update of the utility. Upon completion of the update, the flash utility issues a lock request to the TPM to relock the flash memory.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth such as specific update utilities, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

The present invention makes use of common cryptographic algorithms. Such cryptographic algorithms may be key-based, where special knowledge of variable information called a "key" is required to decrypt ciphertext. There are two prevalent types of key-based algorithms: "symmetric" (also called secret key or single key algorithms) and "public key" (also called asymmetric algorithms). The security in these algorithms is centered around the keys—not the details of the algorithm itself. With asymmetric public key algorithms, the key used for encryption is different from the key used for decryption. It is generally very difficult to calculate the decryption key from an encryption key. In a typical operation, the "public key" used for encryption is made public via a readily accessible directory, while the corresponding "private key" used for decryption is known only to the receipt of the ciphertext. In an exemplary public key transaction, a sender retrieves the recipient's public key and uses it to encrypt the message prior to sending it. The recipient then decrypts the message with the corresponding private key.

It is also possible to encrypt a message using a private key and decrypt it using a public key. This is sometimes used in digital signatures to authenticate the source of a message, and is a process utilized within the present invention.

Figure 3:
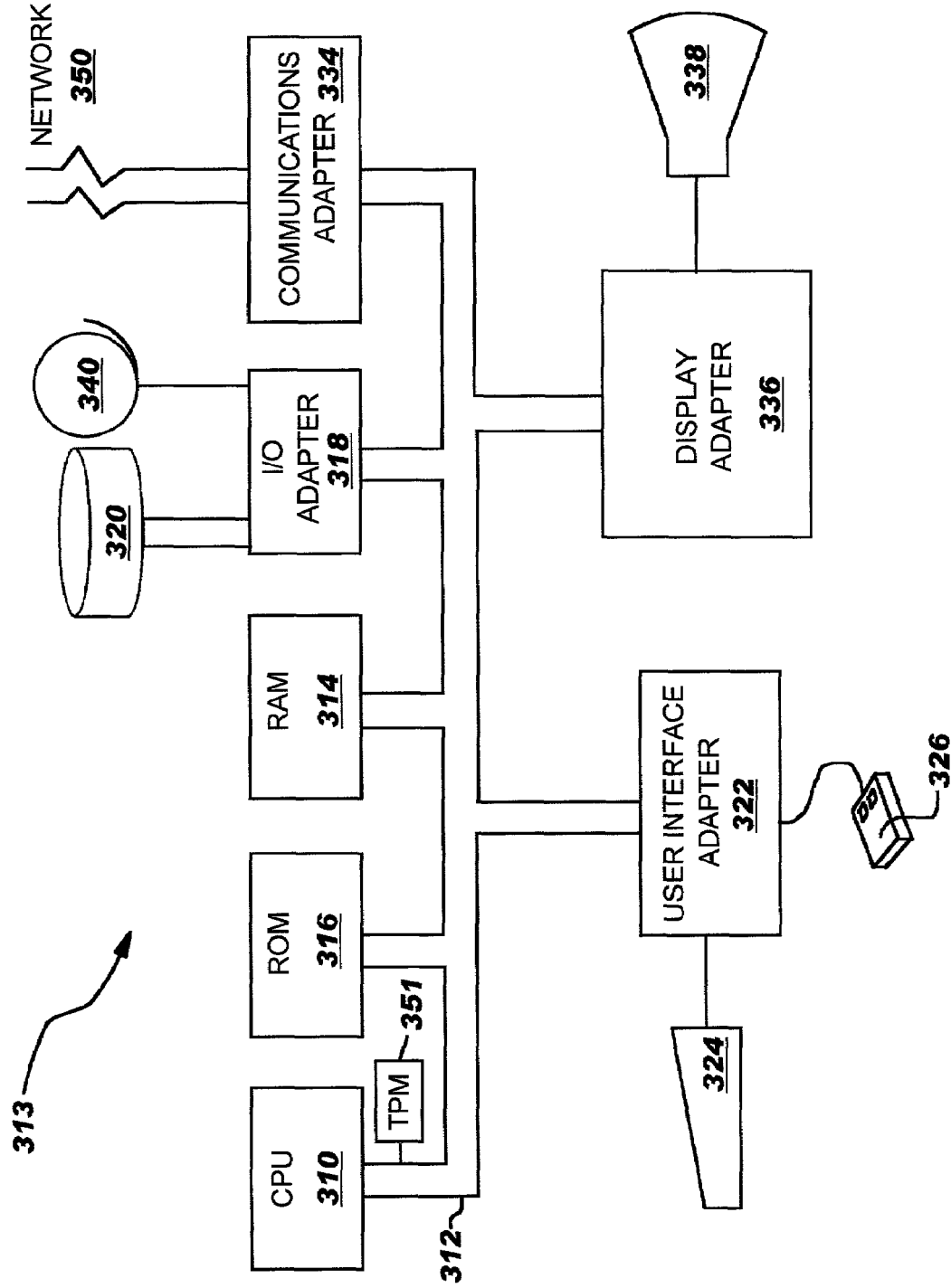
FIG. 3 illustrates an information handling system configured in accordance with the present invention.

Referring to FIG. 3, an example is shown of a data processing system 313 which may be used for the invention. The system has a central processing unit (CPU) 310, which is coupled to various other components by system bus 312. Read only memory ("ROM") 316 is coupled to the system bus 312 and includes a basic input/output system ("BIOS") that controls certain basic functions of the data processing system 313. Random access memory ("RAM") 313, I/O adapter 318, and communications adapter 434 are also coupled to the system bus 312. I/O adapter 318 may be a small computer system interface ("SCSI") adapter that communicates with a disk storage device 320. Communications adapter 333 interconnects bus 312 with an outside network 350 enabling the data processing system to communicate with other such systems. Input/Output devices are also connected to system bus 312 via user interface adapter 322 and display adapter 336. Keyboard 324 and mouse 326 are interconnected to bus 312 via user interface adapter 322. Display monitor 338 is connected to system bus 312 by display adapter 336. In this manner, a user is capable of inputting to the system throughout the keyboard 324 or mouse 326 and receiving output from the system via display 338.

Implementations of the invention include implementations as a computer system programmed to execute the method or methods described herein, and as a computer program product. According to the computer system implementation, sets of instructions for executing the method or methods may be resident in the random access memory 314 of one or more computer systems configured generally as described above. Until required by the computer system, the set of instructions may be stored as a computer program product in another computer memory, for example, in disk drive 320 (which may include a removable memory such as an optical disk or floppy disk for eventual use in the disk drive 320). Further, the computer program product can also be stored at another computer and transmitted when desired to the user's workstation 313 by a network or by external network 350 such as the Internet. One skilled in the art would appreciate that the physical storage of the sets of instructions physically changes the medium upon which it is stored so that the medium carries computer readable information. The change maybe electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

The present invention is described with respect to the update of a BIOS image within a data processing system, such as system 313. However, the present invention is applicable to the update of any data and/or image within an information handling system.

The present invention makes use of the TCPA (Trusted Computing Platform Alliance) Specification where a trusted platform module (TPM) 351 has been installed within system 313. The TCPA Specification is published at www.trustedpc.org/home/home.htm, which is hereby incorporated by reference herein. However, it should be noted that the present invention may also be implemented using other cryptographic verification methods and processes.

Figure 1:
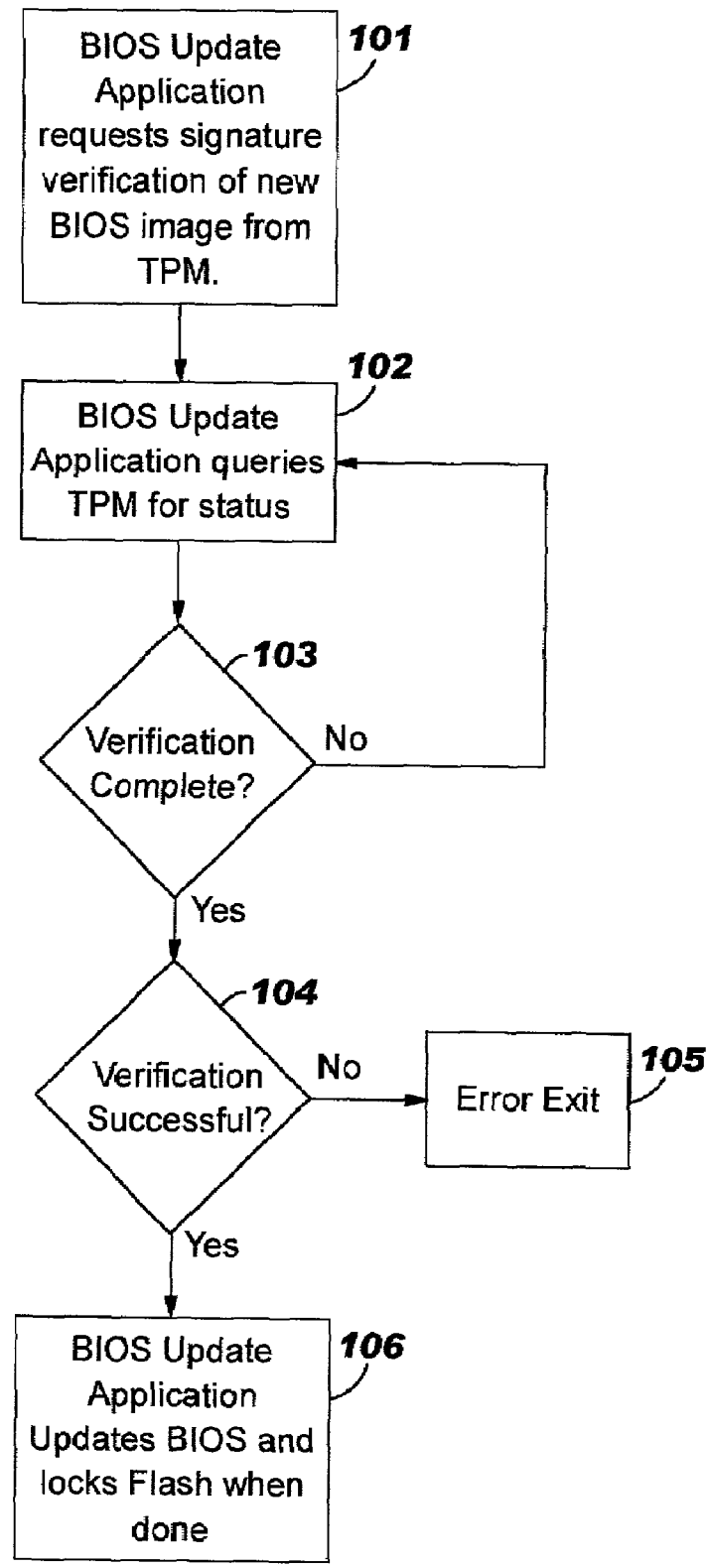
FIGS. 1-2 illustrate flow diagrams configured in accordance with the present invention.

Referring to FIG. 1, system 313, either automatically, or as a result of input from a user, will begin a process where the BIOS image is to be updated. Such a BIOS image may reside within ROM 316 or some other memory module within system 313. The update of the BIOS image may be received over a network 350 or on a diskette.

Referring to FIG. 1, in step 101, a BIOS update application will run on system 313 and will request signature verification of a newly received BIOS image from the TPM 351. This launches the process illustrated in FIG. 2 wherein step 201, the TPM receives the verification request from the BIOS update application and performs a signature verification on the update utility and the updated BIOS image. The TPM 351 may utilize a signature verification process that is a standard method that is used in many cryptographic systems. The sender of the BIOS image computes a "hash" of the original work (a hash is a mathematical computation that is performed on the input; the computation is designed such that the probability of being able to recreate the output without the identical input is low). Then the hash is encrypted using the sender's private key. This encrypted result is called the signature. When the receiver, the TPM 351, wishes to verify that the image is authentic, the TPM 351 computes the hash of what was received. The TPM 351 then decrypts the sender's signature by using the sender's public key and compares it to the newly computed hash. If they are identical, the TPM 351 then determines that the update image is authentic and has not been modified in transit.

Returning to FIG. 1, in step 102, the BIOS update application will continually query the TPM 351 for the status of the verification process. In step 103, if the TPM verification process has not completed, the process will loop back to step 102.

Figure 2:
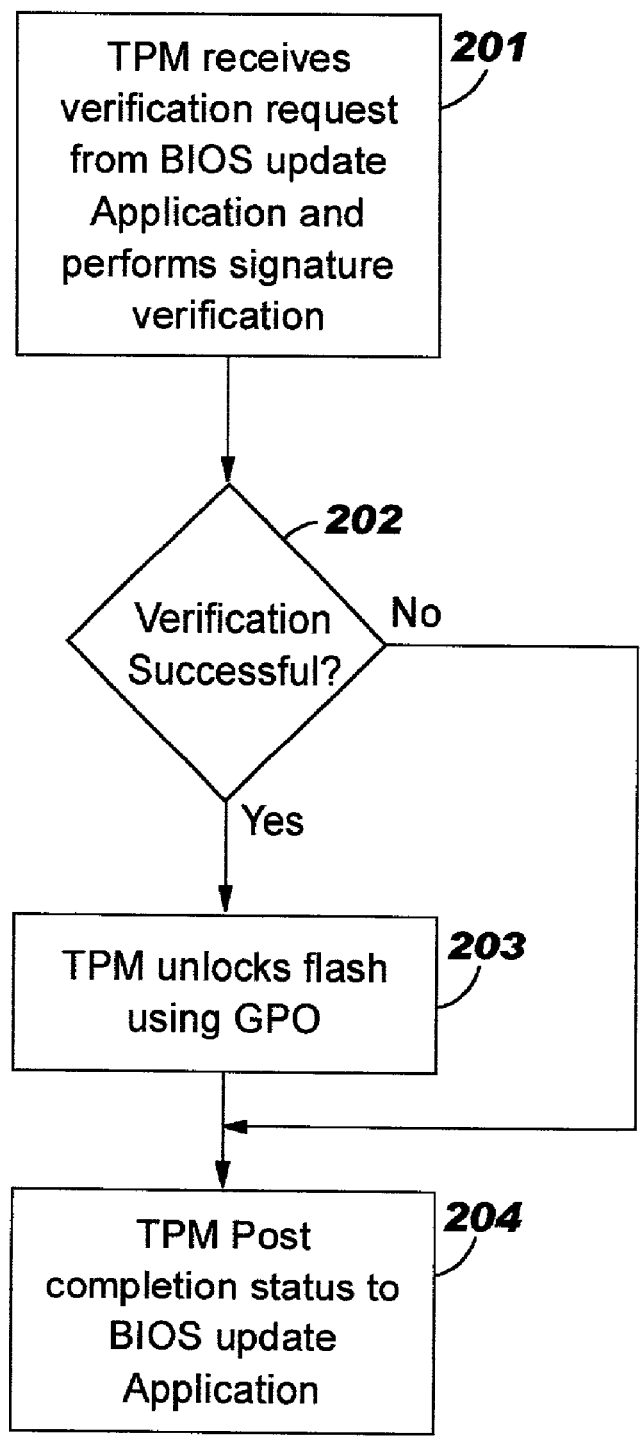

In FIG. 2, in step 202, a determination is made whether the verification process resulted in a successful verification of the BIOS utility and image. If not, the process proceeds to step 204 where the TPM 351 posts that it has completed the verification process and that the process did not result in a successful verification to the BIOS update application.

If in step 202 the verification resulted in a successful verification of the BIOS utility and image, the process proceeds to step 203 where the TPM 351 unlocks the flash memory using various methods, such as a general purpose output pin on the TPM 351. In step 204, the TPM 351 will post that it has completed a successful verification to the BIOS update application.

Returning to step 103, since the verification process has completed in accordance with step 204, the process proceeds to step 104 where if the verification was not successful, then an error message is displayed to the user and the process exits in step 105. If the verification was successful, then the process proceeds to step 106 where the BIOS update application updates the BIOS image, and unlocks the flash memory. Locking the flash memory can be performed by a request to the TPM 351 to perform the locking process.

In addition to the GPIOs there may be new commands to prevent the unauthorized use of the secure unlock function. This requires the addition of a new verify signature command that includes usage authorization. When the TPM 351 receives the secure unlock request, it would first compare the authorization provided by the caller against the authorization stored in the TPM 351. If the compare fails, the command is rejected without unlocking the flash. If successful, the TPM 351 would then proceed to the signature verification step.

The TPM 351 may also have a protocol for storing the BIOS public key and the associated authorization data. This would permit BIOS/and/or management agents to set the authorization. POST code must ensure the authorization data and key are loaded prior to booting the operation. Changing the key or authorization data would require knowledge of the current authorization data.

Although the present invention and its advantages have been described in detail, it should be understood that various changes, substitutions and alterations can be made herein without departing from the spirit and scope of the invention as defined by the appended claims.

What is claimed is:

1. A method for updating a program in a data processing system comprising the steps of:
   requesting a trusted platform module ("TPM") to perform a signature verification of an update to the program;
   the TPM performing the signature verification of the update to the program;
   if the signature verification of the update to the program is successful, using the TPM for unlocking a memory unit storing the program; and
   modifying the program with the update to the program in response to the unlocking of the memory unit storing the program.

2. The method as recited in claim 1, further comprising the step of:
   locking the memory unit after the modifying step.

3. The method as recited in claim 2, wherein the locking step is performed by the TPM.

4. A computer program product for storage on a computer readable medium and operable for updating a BIOS stored in a flash memory in a data processing system, comprising:
   a BIOS update application program receiving an updated BIOS image;
   the BIOS update application requesting a TPM to perform a signature verification of the updated BIOS image;
   a TPM program receiving the request from the BIOS update application to perform the signature verification of the updated BIOS image;
   the TPM program performing the signature verification of the updated BIOS image and posting a result of the signature verification of the updated BIOS image to the BIOS update application;
   if the result of the signature verification of the updated BIOS image determines that the updated BIOS image is authentic, then the TPM program unlocks the flash memory; and
   the BIOS update application modifies the BIOS with the updated BIOS image.

5. The computer program product as recited in claim 4, further comprising:
   programming for locking the flash memory after the BIOS update application modifies the BIOS with the updated BIOS image.

6. The computer program product as recited in claim 5, further comprising:
   if the result of the signature verification of the updated BIOS image determines that the updated BIOS image is not authentic, then an error message is output.

7. A data processing system having circuitry for updating a BIOS stored in a flash memory in the data processing system, comprising:
   input circuitry for receiving an updated BIOS image;
   circuitry for requesting a TPM to perform a signature verification of the updated BIOS image;
   the TPM performing the signature verification of the updated BIOS image;
   the TPM unlocking the flash memory if the signature verification of the updated BIOS image determines that the updated BIOS image is authentic; and
   circuitry for modifying the BIOS with the updated BIOS image.

8. The system as recited in claim 7, further comprising:
   circuitry for locking the flash memory after the BIOS is modified with the updated BIOS image.

9. The system as recited in claim 7, further comprising:
   circuitry for outputting an error if the signature verification of the updated BIOS image determines that the updated BIOS image is not authentic.

* * * * *